United States Patent [19]

Butler

[11] Patent Number: 4,796,404
[45] Date of Patent: Jan. 10, 1989

[54] LIGHT-TRANSMITTING THERMAL BARRIER

[76] Inventor: Robert B. Butler, 20 Tibet Dr., Carmel, N.Y. 10512

[21] Appl. No.: 4,858

[22] Filed: Jan. 9, 1987

Related U.S. Application Data

[60] Continuation-in-part of Ser. No. 783,630, Oct. 3, 1985, abandoned, which is a continuation of Ser. No. 586,636, Apr. 10, 1984, which is a division of Ser. No. 449,682, Dec. 14, 1982, Pat. No. 4,443,978.

[51] Int. Cl.$^4$ .............................................. E04C 2/54
[52] U.S. Cl. ...................................... 52/789; 52/785; 52/788; 52/809; 428/178
[58] Field of Search ................ 52/789, 788, 785, 171, 52/809, 404; 428/178, 441

[56] References Cited

U.S. PATENT DOCUMENTS

| | | | |
|---|---|---|---|
| 1,988,964 | 1/1935 | Barrows | 52/789 |
| 2,288,170 | 6/1942 | Moeller | 428/178 |
| 3,003,599 | 10/1961 | Rubissow | 428/178 |
| 3,160,925 | 12/1964 | Gort | 52/789 |
| 3,577,305 | 5/1971 | Hines et al. | 428/178 |
| 4,198,796 | 4/1980 | Foster | 52/171 |
| 4,275,801 | 6/1981 | Bschorr | 52/789 |
| 4,313,993 | 2/1982 | McGlory | 428/178 |
| 4,314,865 | 2/1982 | Ottawano | 428/178 |
| 4,443,978 | 4/1984 | Butler | 52/1 |
| 4,520,611 | 6/1985 | Shinga et al. | 52/789 |
| 4,544,575 | 10/1985 | Melchion | 428/441 |

FOREIGN PATENT DOCUMENTS

| | | | |
|---|---|---|---|
| 1817569 | 8/1969 | Fed. Rep. of Germany | 52/789 |
| 2705312 | 8/1978 | Fed. Rep. of Germany | 52/789 |
| 6700726 | 1/1968 | Netherlands | 52/809 |
| 646017 | 2/1979 | U.S.S.R. | 52/809 |
| 2065548 | 7/1981 | United Kingdom | 428/178 |

Primary Examiner—Michael Safavi
Attorney, Agent, or Firm—S. C. Yuter, J.S.D.

[57] ABSTRACT

An energy-conserving light-transmitting thermal barrier is disclosed in the form of a packet consisting of two light-transmitting plastic or fiberglass translucent panels between which is sandwiched a multi-layered light-transmitting insulation which consists of clear thermally-insulating flexible plastic sheets on which there are flat air-filled bubbles. The panels may have inner ribs which press on the multi-layered insulation, and the ribs may have barbs to pierce and hold the insulation place. The packets are employed to cover light-transmitting openings in a building. When the packets are supported in rigid frames, such frame assemblies can be used as openable light-transmitting barriers to cover windows, doors and skylights.

21 Claims, 4 Drawing Sheets

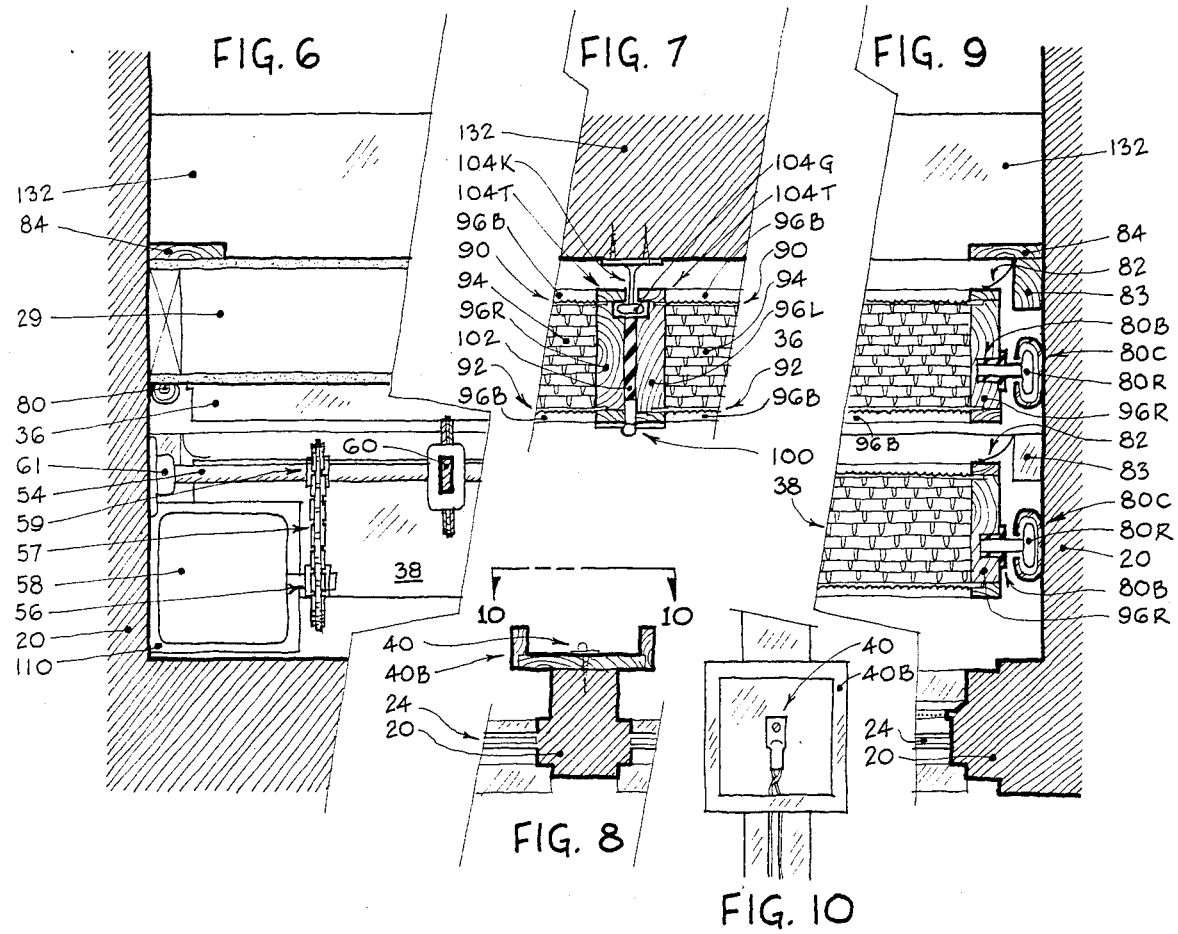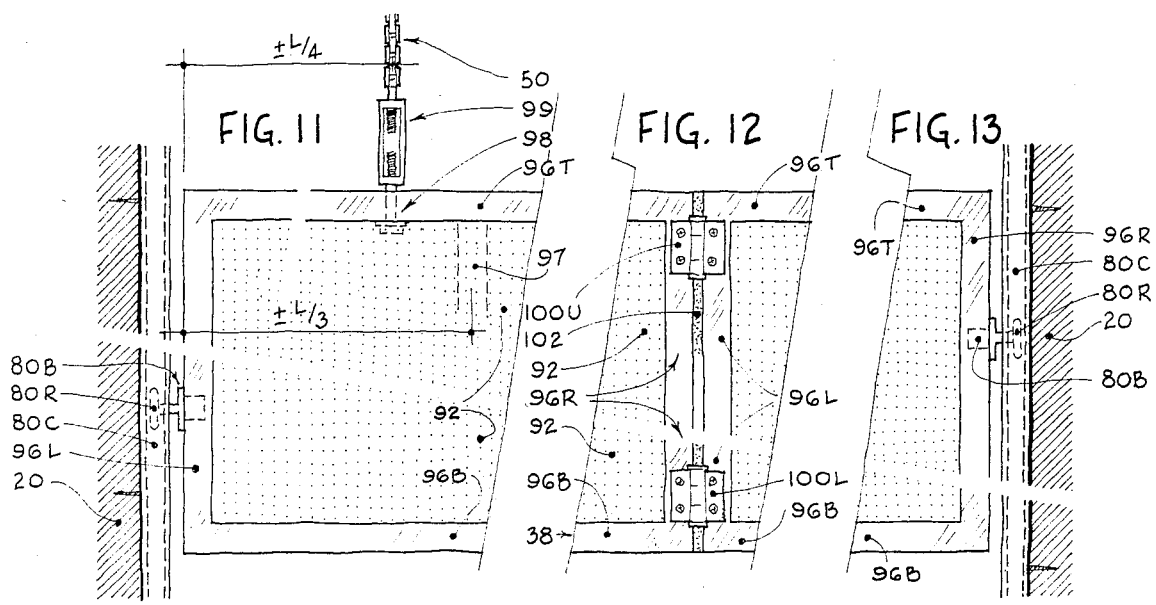

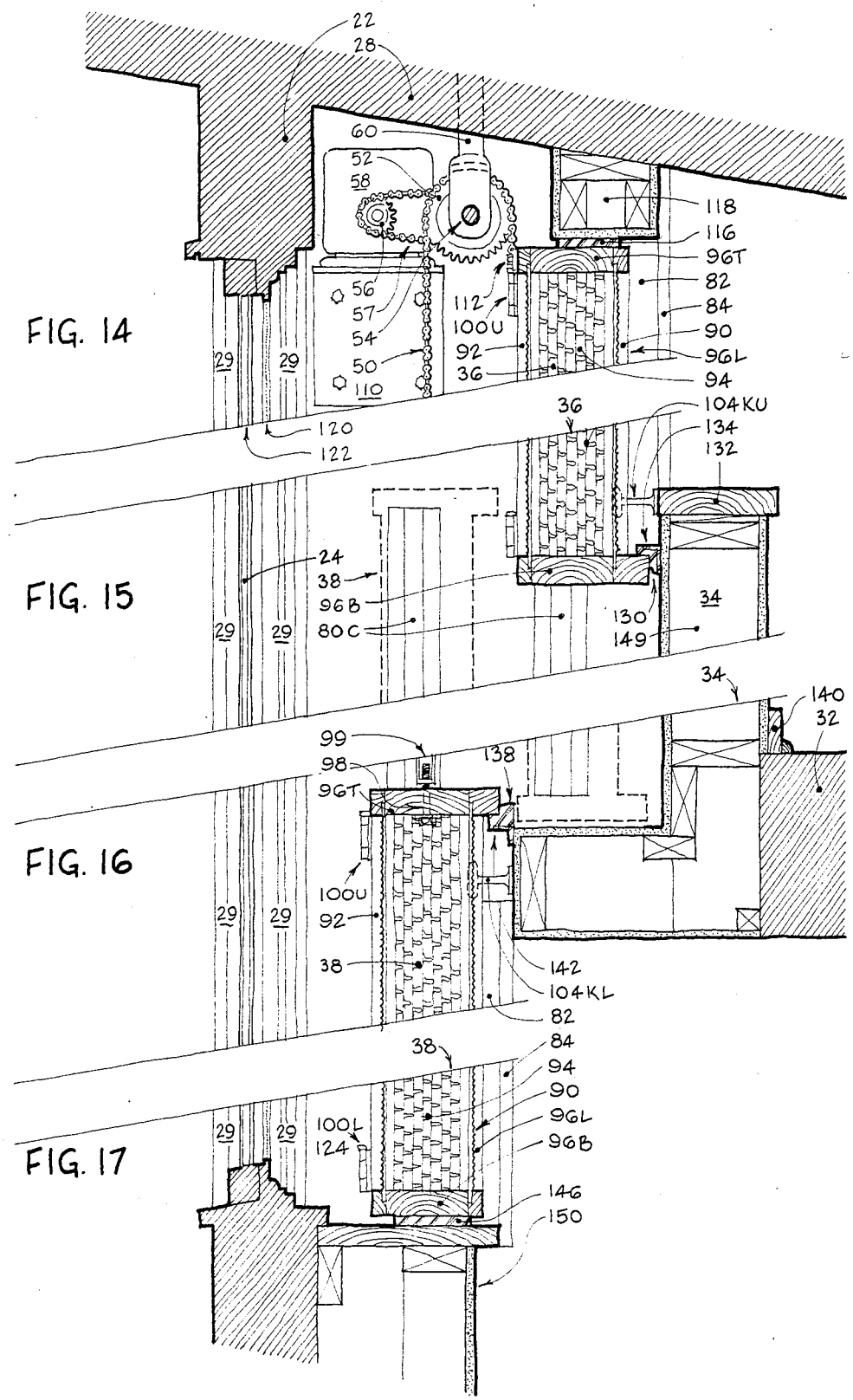

LIGHT-TRANSMITTING THERMAL BARRIER

RELATED APPLICATIONS AND INCORPORATED PATENT

This is a continuation-in-part of application Ser. No. 783,630 now abandoned filed Oct. 3, 1985, in turn a continuation of application Ser. No. 586,636 filed Apr. 10, 1984, in turn a division of application Ser. No. 449,682 filed Dec. 14, 1982, now U.S. Pat. No. 4,443,978 issued Apr. 24, 1984 for Movable Thermal Barrier for Solar Heated Building (herein "Thermal Tri-Panel Patent" Thermal Tri-Panel is an unregistered trademark). The Thermal Tri-Panel Patent is hereby entirely incorporated by reference.

FIELD OF THE INVENTION

This invention relates to energy savings systems and more particularly to light-transmitting thermal barriers in the form of thick translucent insulation for indoor architectural spaces that simultaneously require adequate illumination and comfortable temperatures.

BACKGROUND OF THE INVENTION

The energy crisis of 1973 magnified a seeming architectural conflict between creating adequate indoor illumination and comfortable indoor temperatures: Either have unobstructed daylight flowing through many windows and skylights in a building's walls and roof and experience great amounts of undesirable heat loss through these openings, or have thickly insulated solid walls and roofs enclosing claustophobic interior spaces equipped with arrays of expensive and energy-consuming illumination. Past attempts to resolve this conflict have resulted in "happy mediums" which often are neither economical nor comfortable.

SUMMARY OF THE INVENTION

Accordingly, the principle object of the invention is to simultaneously provide indoor spaces with comfortable temperatures and adequate illumination at considerably lower cost while conserving energy.

Another object of the invention is to eliminate heat flow problems related to what is known as the "kitchen sink effect", in which undesirable heat flow through a room with a window is likened to water flowing through a kitchen sink with a drain, in which no matter how solid the sides and bottom of the sink (i.e. no matter how thickly insulated the walls and ceiling of the room), if the drain is open (i.e. if the window is uninsulated), all the water will eventually drain out of the sink. And likewise all the heat will eventually flow through the window.

A further object of the invention is to economically reduce the loudness of undesirable outdoor sounds which pass through light-transmitting openings in walls and roofs.

These and other objects of the invention are achieved, in accordance with the invention, by a light-transmitting thermal barrier comprising two rigid light-transmitting panels separated by a multi-layered light-transmitting insulation comprising a plurality of flat thermally-insulating flexible plastic sheets on which are air-filled bubbles of plastic. Each plastic sheet is in substantially continuous contact with the adjacent plastic sheet. The panels and plastic sheets are substantially coextensive in area and may be supported in a rigid and nonvacuum-sealed frame.

In accordance with the original embodiment of the light-transmitting thermal barrier invention (disclosed in the parent application), each panel is in substantially continuous contact with the adjacent outside plastic sheet.

In accordance with the improved and preferred embodiment of the light-transmitting thermal barrier invention (first disclosed in this application), each panel has a plurality of orthogonally extending inner ribs which press against the adjacent plastic sheet, and the ribs have orthogonally extending barbs that pierce adjacent plastic sheets to hold them in place.

A feature of the invention is that the light-transmitting thermal barrier can be constructed in the form of a frameless packet for installation in a fixed position between structural or framing members in a wall or skylight, or in the form of a frame assembly for movable installation in a window.

An advantage of the invention is that when the light-transmitting thermal barrier is placed over a window it not only allows the roow to be adequately illuminated but its translucency eliminates the undesirable glare of direct sunlight, and thus it may improve working conditions while also reducing damage to indoor furnishings due to the bleaching action of direct sunlight.

Another advantage of the invention is that the light-transmitting thermal barrier allows windows and skylights to become much larger than is presently feasible due to the great amounts of energy it will conserve. Then such openings can greatly enhance architectural relationships between indoors and outdoors when the light-transmitting thermal barrier is opened.

When the light-transmitting thermal barrier invention is nonmovable, whole walls and roofs can be simultaneously thermally strong and highly translucent.

In these ways the light-transmitting thermal barrier invention, in addition to making indoor spaces more economical to maintain by saving energy, may profoundly affect contemporary architectural design.

BRIEF DESCRIPTION OF THE DRAWINGS

Other objects, features and advantages of the invention will become apparrent from the following detailed description of the embodiments of the invention taken in conjunction with the accompanying drawings in which:

FIG. 6–17 and the associated specification which follows were in the original application which issued as the Thermal Tri-Panel Patent.

FIG. 6 is a top detailed view taken along the lines 6—6 of FIG. 5 of the Thermal Tri-Panel Patent showing the panel motor drive associated with the three connected panel sections of the movable thermal barrier for solar buildings disclosed in that patent.

FIG. 7 is a detailed view taken along the lines 7—7 of FIG. 5 of the Thermal Tri-Panel Patent showing the panel connection means, and the panel section construction comprising the light-transmitting barrier in accordance with the embodiment of the invention disclosed in that patent.

FIG. 8 is a detailed view taken along the lines 8—8 of FIG. 5 of the Thermal Tri-Panel Patent showing the solar sensor means associated with the movable thermal barrier for solar buildings disclosed in that patent.

FIG. 9 is a detailed view taken along the lines 9—9 of FIG. 2B of the Thermal Tri-Panel Patent showing the panel channel guide means, and the panel section construction comprising the embodiment of the light-transmitting thermal barrier invention disclosed in that patent.

FIG. 10 is a front elevational view taken along the lines 10—10 of FIG. 8 of the Thermal Tri-Panel Patent showing the solar sensor associated with the movable thermal barrier for solar buildings disclosed in that patent.

FIG. 11 is a detailed front elevational view taken along the lines 11—11 of FIG. 4 of the Thermal Tri-Panel Patent showing the frame construction of the movable panels of the movable thermal barrier for solar buildings disclosed in that patent.

FIG. 12 is detailed view taken along the lines 12—12 of FIG. 5 of the Thermal Tri-Panel Patent showing the hinged panel sections of the movable thermal barrier for solar buildings disclosed in that patent.

FIG. 13 is a detailed front elevational view taken along the lines 13—13 of FIG. 4 of the Thermal Tri-Panel Patent showing the outer panel guide means of the movable thermal barrier for solar buildings disclosed in that patent.

FIG. 14 is a detailed cross-sectional view taken along the lines 14—14 of FIG. 5 of the Thermal Tri-Panel Patent showing the panel drive means associated with the three connected panel sections of the movable thermal barrier for solar buildings, as well as the panel construction comprising the light-transmitting thermal barrier in accordance with the embodiment of the invention disclosed in that patent, which embodiment is also shown in FIGS. 15-17.

FIG. 15 is a detailed cross-sectional view taken along the line 15—15 of FIG. 5 of the Thermal Tri-Panel Patent showing the inner panel seal of the movable thermal barrier for solar buildings disclosed in that patent.

FIG. 16 is a detailed cross-sectional view taken along the lines 16—16 of FIG. 5 of the Thermal Tri-Panel Patent showing the outer panel seal of the movable thermal barrier for solar buildings disclosed in that patent.

FIG. 17 is a detailed cross-sectional view taken along the lines 17—17 of FIG. 5 of the Thermal Tri-Panel Patent also showing an outer panel seal of the movable thermal barrier for solar buildings disclosed in that patent.

DETAILED DESCRIPTION OF PREFERRED EMBODIMENT OF THE INVENTION

In accordance with the preferred embodiment of the invention shown in substituted FIGS. 1–5, both packets and frame assemblies can be made in any shape and thickness. But certain shapes and dimensions are more desirable than others. The most desirable shape is rectangular, although other shapes such as round, oval and triangular may be employed.

With rectangular packets, the most feasible widths are standard distances between whatever framing members they would fit between (such as $14\frac{1}{4}''$, $22\frac{1}{4}''$ and $30\frac{1}{4}''$), the best lengths are the distance between blocking or lateral bracing in such framing (maximum of 8'), and the most feasible thicknesses are 4" and 6" for most walls and 8" or 10" for most roofs. The packets can easily be made in modular sizes as is batt insulation, and in ways that allow them to be easily cut with a power-saw on the site to fit into any size framing opening.

With frame assemblies, the most feasible lengths and widths are those equalling the dimensions of common window and door units. Due to the insulation's extreme light weight (about 0.9 lb/sq.ft. when 5" thick), even a frame for a large opening would be light enough for one person to carry and install. One source of these frame assemblies would be window and skylight and door companies who manufacture them for their own products. However, a frame assembly can also be made onsite to fit any size opening by cutting a modular dimensioned packet and then inserting it into a custom built frame.

As the thermal (R) value of light-transmitting thermal barriers made in accordance with the invention is about 4.5 per inch thickness, in all installations this barrier would be thermally superior to popular opaque batt insulation, whose R value is 3.5 per inch thickness.

Construction of the thermal barrier requires four basic materials: insulation, panels, frame assemblies and connectors. Packet construction involves stacking several layers of insulation between two panels that form the packet's outer surfaces. Frame assembly construction involves inserting a packet into a wood or metal frame strong enough to be connected with suitable hardware to the surrounding architecture or each other.

Figure 1A:
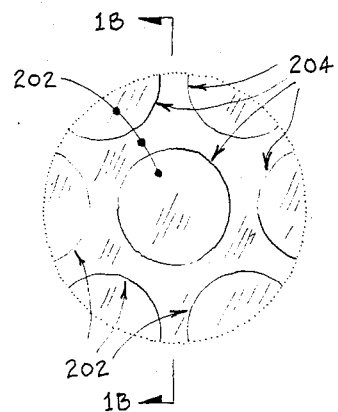
FIG. 1 is a diagram showing the construction of the flat flexible plastic sheets (FIG. 1B) and the arrangement of their flat bubbles (FIGS. 1A), which comprise the multi-layered light-transmitting insulation in accordance with the preferred embodiment of the invention shown in FIGS. 1-5.
Figure 1B:
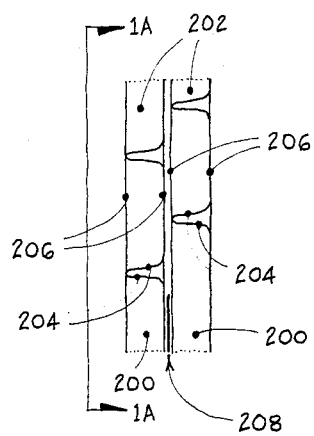
Figure 2:
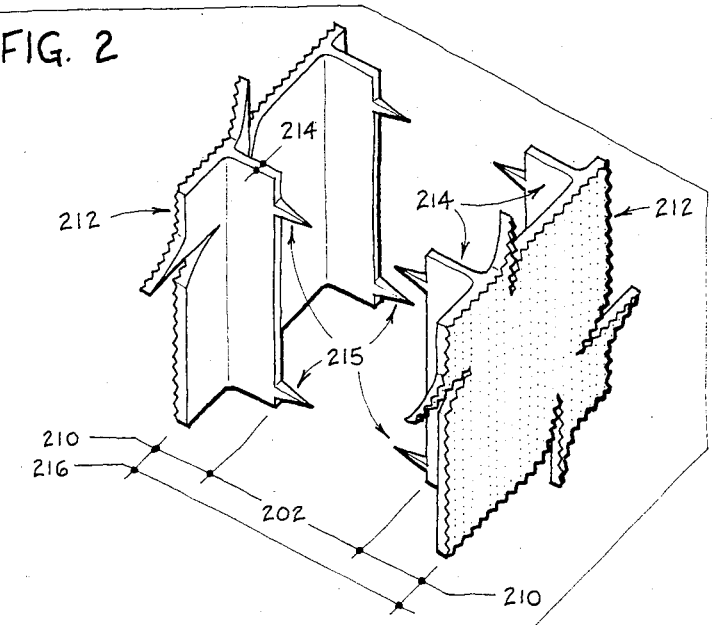
FIG. 2 is a perspective view of the two rigid light-transmitting panels, with their barbed ribs, that sandwich the layers of plastic sheets shown in FIG. 1 to make a light-transmitting thermal barrier in the form of a packet.

Referring to FIGS. 1A and 1B, each layer 200 of insulation consists of bubbles 202 contained in a group of circles 204 arranged in an hexagonal patter between two thin flat flexible plastic sheets 206. The plastic is lightweight, fire-resistant and ultraviolet-resistant. Strips of clear double-stick double-sided Scotch brand or a similar type of pressure sensitive adhesive tape 208 may be applied between the layers 200 to hold them together and to keep them from sagging out of position. Such adherence may be important in vertical installations.

Each layer 200 resembles the common packaging material sold under the trademark Bubblepak by Sealed Air Corporation of New York City. Two other trademarks for the same material are Jifcell owned by Gafcell Industies Inc. of New York City and Cushion-Wrap owned by Prudential-Feldco Inc. of Chicago, Ill. Many other companies make this product. It is made of polyethelene sheets that are 24 to 48 inches wide, $\frac{1}{8}$ to $\frac{1}{2}$ inch thick and 100 to 1000 feet long. The product is an arrangement of bubble-like shapes on a flat sheet of usually clear plastic that is extremely thin (0.00021 inches). The material is intended to be wrapped around merchandise or other inanimate objects to protect them from damage if dropped or otherwise knocked about, and is widely used to protect merchandise during handling, shipping or mailing.

But each layer 200, in accordance with the invention, is preferably about ⅞" thick. It is factory-made by a similar economical pressure-heating process that shapes two paper-thin layers of clear plastic into the final arrangment. Thus, the thermal barrier invention requires only a few layers in thickness at a great savings in labor.

The layers 200 of the light-transmitting thermal barrier invention are sandwiched between two flat translucent panels 210 (FIG. 2) with panels 210 forming the "bread" and layers 200 forming the "meat". Each panel 210 contains an outer pane 212 and orthogonally-extending inner ribs 214. Along the outer edge of each rib 214 are orthogonally-extending barbs 215 which at least pierce the outer sheet 206 of the outer layer 200. Preferably the barbs 215 are long enough to pierce two layers 200. The panels 210 and several layers 200 together comprise a packet 216 of translucent insulation.

The panels 210 are made of lightweight translucent plastic or fiberglass and are shatterproof, fire-resistant and ultraviolet-resistant. Each panel is preferably 0.06" thick and weighs 0.30 lb/sq.ft. of surface area. Each of the ribs 214 is preferably about 1/16" thick, ⅜" wide and located about 4" from an adjacent rib 214. The ribs 214 give the panels 210 extra strength, their depth eliminates one layer of insulation and the barbs 215 hold at least the outer layer 200 in place for the lifetime of the installation. The outer surfaces of the panels 210 may be smooth or mottled. Smooth surfaces may be slightly easier to clean, but mottled surfaces create more opportunities for aesthetic variety and increase airfilm resistance which slightly increases R value. The outer surface of each panel 210 may also be coated with a clear fire-resistant chemical inhibitor that releases steam if the material is exposed to temperatures above 212° F.

Figure 3A:
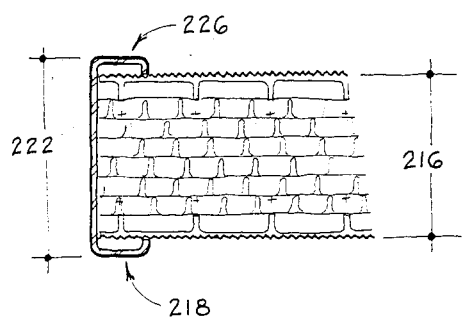
FIG. 3A is a cross-sectional view of a frame assembly incorporating the packet of FIG. 2 and employing a metal frame.
Figure 3B:
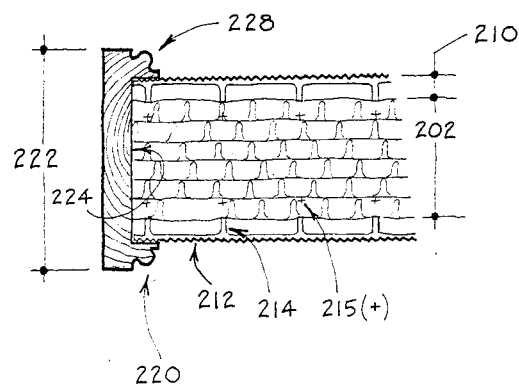
FIG. 3B is a cross-sectional view of a frame assembly incorporating the packet of FIG. 2 and employing a wood frame.

Referring to FIGS. 3A and 3B, the perimeter of a packet 216 may be enclosed by a metal frame 218, a wood frame 220, or a frame of similar suitable material to form with the packet a complete frame assembly 222 of translucent insulation that may be attached to the architecture surrounding an opening in which the thermal barrier invention is installed. With a metal frame 218, the packet 216 fits into the interior of the frame, while with a wood frame 220, the packet 216 fits into a recess 224 along the inside of the frame. This recessed feature in either the metal frame 218 or wood frame 220 holds the packets 216 in place and keeps the several layers 200 together via compressive stacking. The outer edges of frames 218 and 220 may be given a functional cross section such as at 226, or a decorative cross section such as at 228, resembling traditional moldings, commonly used trims, or other aesthetic treatments, and may be painted any color. The total frame construction emphasizes light weight, easy replaceability in case of damage, adequate strength (they are designed to support 2.5 times the total frame weight and to resist lateral loads of 5 lb/sq.ft. applied over their total surface), and ability to connect to to the surrounding architecture. Deflection tolerances of frames 218 and 220 are less than 0.03 in/lin.ft. Several kinds of easily available weatherstripping may be installed around a frame assembly's perimeter to improve the thermal barrier's total insulating ability.

Figure 4:
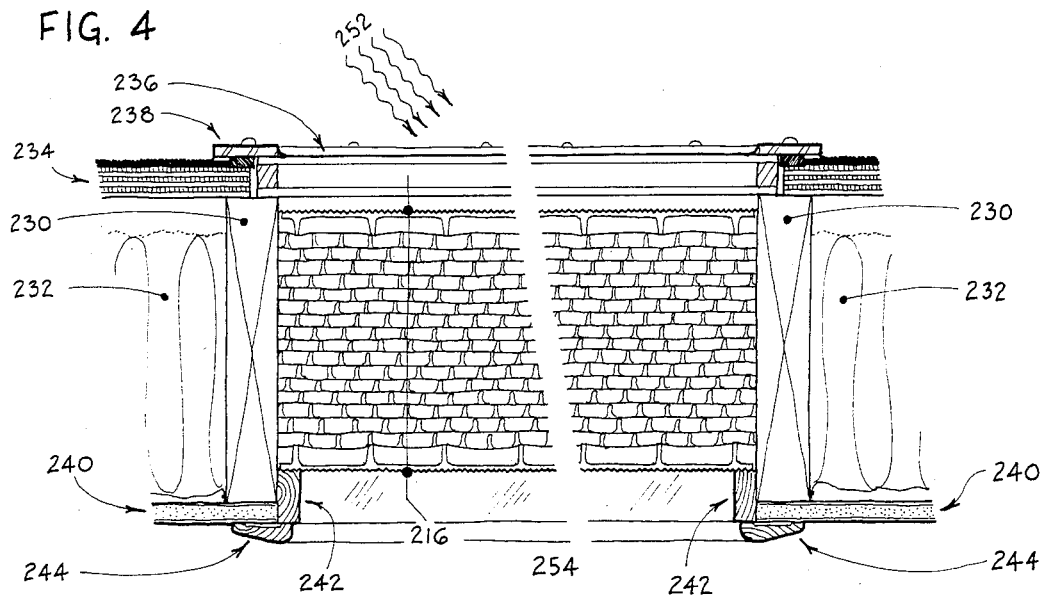
FIG. 4 is a cross-sectional view of the packet of FIG. 2 installed in a fixed position in a skylight or wall.

FIG. 4 shows a typical packet installation in accordance with the invention. A packet 216 is fitted between the framing members 230 of the architecture. Between the architectural framing is other insulation 232. On the outside of the framing is the exterior finish 234, glazing 236, and trim strips 238 that hold the glazing 236 to the exterior finish 234 and/or framing members 230. On the inside of the framing is the interior finish 240, perimeter stops 242 that hold the packet 216 in place, and perimeter moldings or finish trim 244. This installation is appropriate for nonmovable types of the translucent thermal barrier invention located in roofs and walls.

Figure 5:
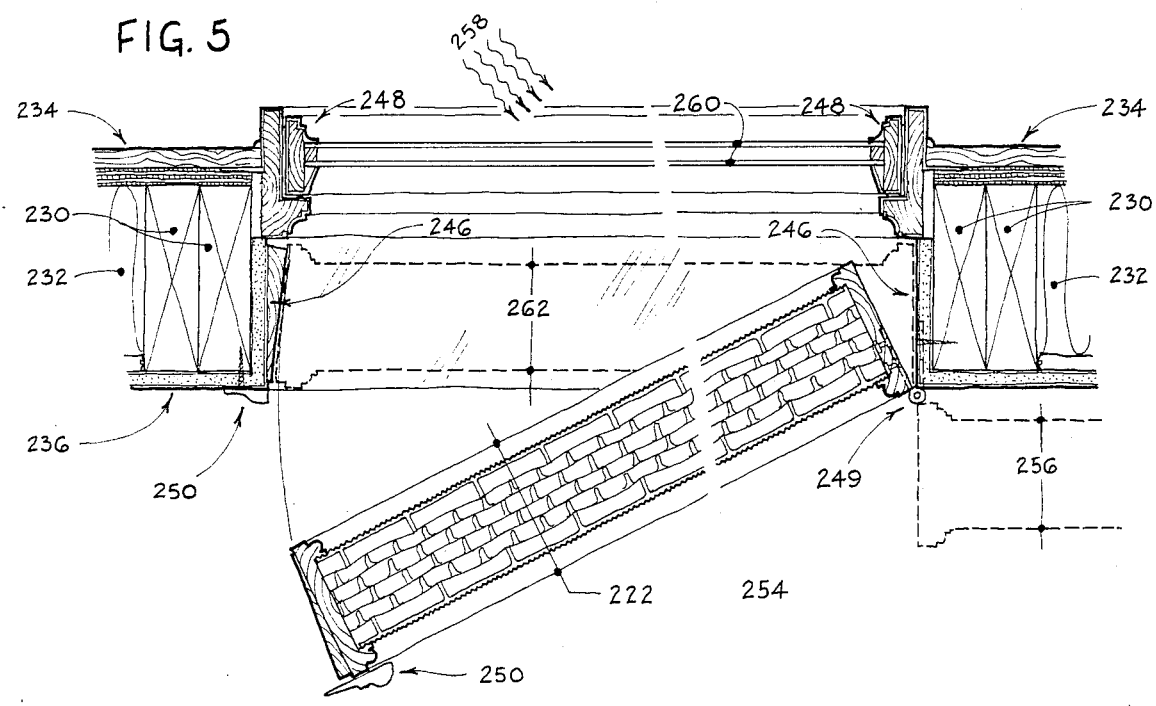
FIG. 5 is a cross-sectional view of an openable frame assembly of FIG. 3B installed in a window.

FIG. 5 shows a typical frame assembly installation in accordance with the invention. A frame assembly 222 is fitted between the sides or opposite edges 246 of an architectural opening 248, which may be a glazed window, door, fire exit, or other type opening satisfying the special requirements of the architecture. It is attached to one of the edges 246 by hinges 249 or similar hardware and to the opposite edge 246 by a latch or clasp assembly 250.

Frame assemblies 222 comprising panels that slide up and down may be suspended from common garage door cable and guided by the kind of roller guide system found in the overhead back doors of moving van type truck trailers (the latter hardware is well known and has many industrial applications). For large openings, frame assemblies 222 in the form of panels may be attached to each other with hinges and weatherstripping installed in the seams.

A specific application of the light-transmitting thermal barrier invention in the form of panels comprising a movable thermal barrier for covering large architectural openings is shown in the Thermal Tri-Panel Patent and hereinafter described in detail in connection with FIGS. 6-14.

In operation, a packet 216 (FIG. 4) is designed to remain in fixed position for the life of the installation in a way that allows exterior illumination 252 to pass through the packet 216 into interior spaces 254 while greatly reducing heat flow through the packet, whether the heat surplus be indoors and desirable in cold weather or outdoors and undesirable in hot weather.

In operation, a frame assembly 222 (FIG. 5) is designed to fit into the architectural opening 248 in a way that—in addition to the operation of packets 216—allows the frame assembly 222 to be arranged in open position 256 when sunrays 258 can pass through the glazing 260 into interior space 254, or arranged in closed position 262 when sunrays 258 cease to shine on the glazing 260. This open-and-close movement may be performed manually, automatically according to some desired schedule, or thermo-electronically as disclosed in the Thermal Tri-Panel Patent.

DETAILED DESCRIPTION OF ORIGINAL EMBODIMENT OF INVENTION (FIGS. 1-5 of Tri-Panel Patent and FIGS. 6-14)

In the following detailed description of the movable thermal barrier for solar heated building disclosed in the Tri-Panel Patent, the reference to FIGS. 1-5 are to those figures in the patent unless otherwise stated. FIGS. 6-17 are the same in the patent and in this application.

Referring to FIG. 1 of the drawings, building 20 comprises front wall 22 with its glass wall 24 generally facing in a southerly direction, rear wall 26, roof 28, first floor 30, and second floor 32. Projecting vertically from the window wall end of second floor 32 is rail panel 34. Between the window wall 24 and rail panel 34 is inner panel 36 and outer panel 38. Mounted on a mullion of window wall 24 is solar sensor box 40. Mounted on the rear wall 26, beneath the roof eave 29, is outdoor temperature sensor box 42.

The inner panel 36 and outer panel 38 are supported by chains 50 (see FIGS. 2A and 2B showing one of the chains 50) which pass over sprocket wheels 52 mounted on an axle 54. The axle 54 (also see FIG. 6) is rotatably driven via gear 56 of motor drive mechanism 58. The axle 54 is supported from roof 28 by hangers 60.

The motor drive mechanism 58 is basically a garage door motor drive system with associated slip clutches and gear controls. When the input terminals of motor drive mechanism 58 are momentarily shorted it rotates axle 54 until the inner panel 36 and outer panel 38 are moved either to a fully closed position (as shown in FIG. 2A) or to a fully open position (as shown in FIG. 2B). More particularly, if the panels 36 and 38 are fully open, then the operation of motor drive mechanism 58 will fully close them. Or, if panels 36 and 38 are already fully closed, momentary shorting of the input terminals of motor drive mechanism 58 will cause the panels to fully open.

The automatic control system 62 to open and close panels 36 and 38 is shown in block diagram in FIG. 1. Automatic control system 62 comprises control unit 64 whose inputs are the 110 volt AC line 66 to power the system, a solar sensor 40 (shown in FIG. 10 as located in solar sensor box 40B), an indoor temperature sensor 68, and an outdoor temperature sensor 42. The outputs of control unit 64 are the motor drive circuit 70, which comprises in series a differentiator 76, relay 78, and the motor drive mechanism 58. Differentiator 76 functions to differentiate any change in the voltage level output of control unit 64 in order to momentarily operate relay 78 which, in turn, momentarily shorts the input control terminals of the motor drive mechanism 58. Thus, with each change of output voltage level from control unit 64, the motor drive mechanism 58 is operated either to fully close or fully open panels 36 and 38. As will hereinafter be explained in greater detail, control unit 64 monitors the solar sensor 40, the indoor temperature sensor 68, and (optionally) an outdoor temperature sensor 42, to open or close panels 36 nd 38 in order to prevent overheating of the indoor spaces when the sun is shining in warm weather and loss of indoor heat when the sun is not shining in cold weather. Wall switch 79, which produces a momentary shorting contact, is connected directly to motor drive 58 and provides a manual override to open or close panels 36 and 38 manually for the purpose of privacy or reducing externally generated noise inside the building 20.

An accessory part of the automatic control system 62 is a thermostat control 69 with backup heating 72 and backup cooling 74. This serves to keep interior spaces comfortable during those brief times when intense outdoor cold makes indoor temperatures fall below the lower limit of comfort dialed on the thermostat 69, or when intense outdoor heat makes indoor temperatures rise above the upper limit of comfort dialed on the control unit 64.

The arrangement of the panels 36 and 38 and the panel mounting means is shown in detail in FIGS. 3-5. In FIG. 5 the inner panel 36 and outer panel 38 are shown in closed position with the rail panel 34 indicated by the horizontal dashed lines (since the FIG. 5 view is taken just inside glass wall 24). Inner panel 36 consists of three flexibly connected panel sections 36L, 36M, and 36R (from left to right). Similarly, outer panel 38 consists of three flexibly connected panel sections 38L, 38M, and 38R. Each of the panel sections is supported by a pair of chains 50, with the ends of each chain 50 connected to the top portion of each panel section. Each chain 50 passes over a sprocket wheel 52 on axle 54. Axle 54 is driven by motor drive mechanism 58. The vertical guide channel means 80 at each end of panels 36 and 38 and fastened to side walls 20 keeps panels 36 and 38 in the proper vertical alignment.

The motor drive mechanism 58 is shown in greater detail in FIG. 6, together with part of one vertical guide channel means 80 and the insulating header 29 constructed above the inner panel 36. Motor drive mechanism 58 drives axle 54 via drive gear 56, drive chain 57, and axle drive gear 59. The axle 54 is supported by hangers 60 connected from the roof and by the axle end plate 61 located only at the axle end near the motor 58. The axle end plate 61 and each axle hanger 60 contain ball bearings that enable the axle to rotate smoothly.

FIG. 7 shows how two adjacent panel sections are flexibly connected, as well as the construction of each panel section. For example, panel section 36M (as well as all other panel sections) consists of two spaced translucent plastic panes 90 and 92 separated by layers of translucent plastic insulation 94 such as bubblepak plastic sheet. The outer edge of each pane 90 and 92 is mounted within a surrounding box frame 96 comprising wooden top and bottom frame members 96T and 96B and left and right frame members 96L and 96R. A pair of panel connecting members 98 (see FIGS. 5 and 11) connect each panel section to its associated pair of chains 50.

The panel sections such as panel sections 36L and 36M are flexibly connected by hinges 100 screwed into the associated left and right frame members 96L and 96R (FIG. 12), with a pair of hinges 100U on the outer sides of the upper portions of panel sections 36L and 36M and a corresponding pair of hinges 100L on the outer sides of the lower portions of panel sections 36L and 36M. Separating each pair of adjacent panel sections is a compressible rubber seal 102 (see FIGS. 7 and 12) running along the full length of the seam between each left and right frame member 96L and 96R (FIG. 12). The compressible rubber seal 102 allows for heat expansion of the panel sections, provides insulation, and prevents air from passing through the panel seams. Channel guide means 104 (FIG. 7) located on the inner side of each panel seam keep each of the panel sections in its proper vertical track. Each panel guide means 104 consists of a panel guide knob 104K, a groove 104G cut into the corners of panel frame members 96L and 96R, and two trim pieces 104T which hold each panel guide knob in place.

The construction of the solar sensor mounting box 40 for the solar sensor 40S is shown in FIGS. 8 and 10. The box 40, constructed from pine or similar softwood and screwed to mullion 110 of the glass wall 24, is designed to keep the solar sensor 40S out of the direct rays of the sun. The construction of outdoor temperature sensor box 42 (FIG. 1) and the mounting of its outdoor temperature sensor 42S inside (not shown) is substantially the same. However, whereas the solar sensor mounting box 40S is mounted with its back in a vertical plane, the outdoor temperature sensor box 42S is mounted against the underside of the north roof eave with its back in a horizontal plane and its open side facing downward.

FIG. 9 shows how the panels 36 and 38 are kept in alignment by the guide channel means 80 as the panels move up and down, and also shows the vertical sealing members 82 that function when the panels 36 and 38 are in closed position. Vertical guide channel means 80 consists of vertical channel 80C mounted against the inside face of the building's side walls 20, and channel guide roller 80R which fits into and slides up and down in channel track 80C and whose stem is connected to the outer edge faces of the panels 36 and 38. The channel guide roller 80R (which contains ball bearings that allow it to rotate easily) connects to the panel frame members 96R and 96L at each end via a metal bushing 80B (into which the stem of the guide roller 80R is inserted) that is mounted tightly in the end faces of the outer frame members 96R and 96L. There are eight guide rollers 80R and metal bushings 80B in all: four in the outer panel 38 (two at each end, with one near each top and one near each bottom) and four in the inner panel 36 (two at each end, with one near each top and one near each bottom).

The vertical sealing member 82 shown in FIG. 9 is made from soft flexible rubber material and extends vertically for the full height along the inside faces of both outer ends of panels 36 and 38 when said panels are in closed position. Each vertical seal 82 is fastened along its whole length to a piece of wood blocking 83 (nailed into the building's side walls 20) and presses against the inside face of each panel frame member 96R and 96L when panels are in closed position. To hide the unaesthetic vertical seal 82 from indoor view, a piece of wood molding 84 is fastened to the inside face of each wood blocking 83.

FIGS. 11-13 taken together comprise a front elevational view of the outer panel 38, which except for the connecting members 98 and turnbuckles 99 is the same as inner panel 36. FIG. 11 shows a front elevational view of the panel frames 96B, 96L, and 96T; the mottled surface of the outer translucent plastic pane 92; the lower front guide roller 80R as it fits into the vertical channel 80C mounted against the inside face of the building's side wall 20; and how each connecting member 98 is bolted to its associated top horizontal frame member 96T at about a quarter of the panel section length from each outer edge. Inner panel framing member 97 exists at approximate ⅓ points along the length of each panel section, and serves to strengthen the panel sections and allow the translucent insulation to be installed in easily obtainable widths of approximately 32 inches.

FIGS. 14-17 taken together show a cross-sectional view of the main physical components of the Thermal Tri-Panel system with the inner panel 36 and outer panel 38 shown in their closed positions and in dotted outline in their open positions. Also shown is a cross-sectional view of the light-transmitting barrier in accordance with the original embodiment of the invention. Referring particularly to FIG. 14, motor drive mechanism 58 is mounted on a L-shaped bracket 110 bolted to structural members behind the inside wall of building 20. Inner panel 36 is connected to chain 50 by panel connector 112 bolted to the top panel frame 96T of inner panel 36. Soft rubber seal 116 is adhered to header 118. As indicated above, in accordance with the original embodiment of the invention, the inner panel 36 (as well as the outer panel 38) is constructed in a wooden frame with translucent plastic panes 90 and 92 separated by a multi-layered insulation (preferably Bubblekpak plastic sheet 94). Bubblepak 94 is made from a clear plastic on which are bubbles of plastic about one inch in diameter and three-eighths inch thick. While the plastic is basically transparent, the net effect of the multilayers of BubblePak Plastic sheet is that in insulation 94 is translucent. Thus, the combination of the translucent panes 90 and 92 and the BubblePak insulation 94 is to produce a panel which is translucent. Thus, the panels 36 and 38 are light-transmitting so that when they are closed ample light passes through them into the interior spaces of the building 20.

Also shown in FIG. 14 is screen 120 to screen a top openable window 122 (FIG. 1). A similar screen 123 (FIG. 17) screens a bottom window 124 (FIG. 1). The purpose of openable windows 122 and 124 is to provide ventilation, especially when the panels 36 and 38 are closed and the air between the glass wall and the thermal barrier formed by the panels is excessively hot. Around the glass are shown the side moldings 29.

When the panels 36 and 38 are closed, they combine with rail panel 36 to produce a thermal barrier. Soft rubber seal 130 (FIG. 15) is adhered along the total length of rail panel 34 just below its railing 132 and beneath L-angle 134. L-angle 134 holds seal 130 and is screwed into the framing of rail panel 34. Similarly, soft rubber seal 138 (FIG. 16) is adhered along the total length of rail panel extension 140 which extends from the structure of second floor 32. More particularly, seal 138 is adhered to L-angle 142 which is screwed into the framing of rail panel extension 140. Finally, a soft rubber seal 146 (FIG. 17) is adhered along the entire length of the underside of outer panel 38. Thus, when the panels 36 and 38 are fully closed, the horizontal seals 116, 130, 138, and 146 together with the end vertical seals 82 (FIG. 9), 87 (FIG. 9), and the seam vertical seals 102 located between the panel sections 38 (FIG. 7) produce a fully insulated thermal barrier between the glass wall 24 (FIG. 1) and the adjacent interior spaces of building 20.

FIGS. 14-17 also show elevational views of the vertical sealing members 82 that extend for the full height along the inside of both outer ends of panels 36 and 38 when said panels are in closed position. Also shown are the pieces of wood molding 84 that are fastened to the pieces of wood blocking 83 (see FIG. 9) located behind the seals 82.

FIGS. 15 and 16 also show a side view of the assembly of the panel guide knobs 104K which hold the seams of the flexible panel sections at the proper distance from the top and bottom of the rail panel 34. The upper guide knobs 104KU are screwed into the outer edge of the rail panel railing 132; and the lower guide knobs 104KL are screwed into the framing inside the rail panel extension 104. All cavities between the framing members of rail panel 34 and rail panel extension 140 are filled with fiberglass batt insulation 149.

FIGS. 15 and 16 furthermore show an elevational view of the vertical channels 80C located at each end of the outer panel frame 38 and inner panel frame 36. Each pair of outer vertical channels 80C extends from the bottom of panel frame 96B of outer panel 38 when in closed position to the top of panel frame 96T of said panel when in open position; and each pair of inner vertical channels 80C extends from the bottom of panel frame 96B of inner panel 36 when in open position to the top of panel frame 96T of said panel when in closed position.

OPERATION

A thermal barrier in accordance with the Thermal Tri-Panel invention disclosed in the Thermal Tri-Panel Patent can control the flow of huge amounts of British Thermal Units (BTUs) in and out of building 20 all year round, even when no one is in the building.

The thermostat 69 is of the type that has a temperature setting for establishing the lower limit (in degrees F. or C.) of the desired comfort zone; while the control unit 64 has a temperature setting for establishing the upper limit of the desired comfort zone. For example, say the occupants of the building 20 want the temperature of its interior spaces always to remain between 67 and 77 degrees F. In this case, the occupant would dial the thermostat 69 dial to 67 degrees (the lower limit of the comfort zone) and the control unit 64 dial to 77 degrees (the upper limit of the comfort zone).

For a typical winter day, the automatic control system operates as follows. At sunrise, it is cold outside, sunrays are weak, and the panels 36 and 38 are closed. Assume that the indoor temperature sensor 68 senses 67 degrees or above and the temperature in the enclosed space between the closed panels 36 and 38 and the southerly glass 24 is well below 67 degrees. As the morning sun becomes stronger, it raises the temperature of this enclosed space. When this temperature reaches eight degrees F. warmer then the temperature sensed by indoor temperature sensor 68 (which would be 75 degrees if the indoor temperature is 67 degrees), control unit 64 responds by opening the panels 36 and 38; and solar energy begins flowing indoors. All day long room temperatures steadily rise. Any thermal reservoirs inside absorb excess heat for replenishing at night. If and when the indoor temperature rises above the upper limit of 77 degrees, control unit 64 responds by closing panels 36 and 38.

If, when the panels 36 and 38 are open, the sky should become cloudy and solar temperature sensor 40 senses a temperature less than 3 degrees above the sensed indoor temperature, then control unit 64 responds by closing panels 36 and 38. And if the clouds go away, the moment the solar temperature sensor 40 senses a temperature of eight degrees above the indoor temperature, control unit 64 again opens panels 36 and 38.

Late in the afternoon, as the sum weakens, the sensed solar temperature falls. The moment solar temperature sensor 40 senses a temperature less than three degrees above the sensed indoor temperature, control unit 64 closes the panels 36 and 38 to keep in the collected heat.

In the evening, while outdoor temperatures are low, heat passes very slowly through the thickly insulated envelope of building 20. As it does, heat from any thermal reservoirs trickles back into the interior spaces. Whenever the temperature sensed by thermostat 69 falls below 67 degrees, thermostat 69 turns on backup heating 72 to raise the temperature in the indoor space to 67 degrees. In the summer, thermostat 69 is set to turn on the backup cooling at 77 degrees.

Outdoor temperature sensor 42 may optionally be used to enhance the function of the automatic control system 62. In this event, when the outdoor temperature sensor 42 senses that the outdoor temperature is eight degrees warmer than the indoor temperature sensed by indoor temperature sensor 68, control unit 64 responds by closing the panels 36 and 38 if they are open. The purpose is to prevent outdoor heat from flowing through the glass wall 24 during warm weather due to the panels being open.

The automatic control system 62 operates in a similar fashion in the summer time.

If the panels 36 and 38 get out of synchronism with control unit 64, say the panels are open when they should be closed, then manual switch 79 may be momemtarily operated to return the panels 36 and 38 to the correct position.

The motor drive mechanism may be an electric garage door opener of the type supply by Sears, Roebuck and Co. (example: Order No. 64H6638), in which the panels 36 and 38 may be operated by radio control.

The thermostat 69 may be a Honeywell micro-electronic Chromotherm Model T8200A with a sub-base model Q6000A1005.

Control Unit 64 may be a C-120 differential temperature control and performance monitoring unit supplied by Independent Energy Inc. of East Greenwich, Rhode Island. The C-120 would be programmed in accordance with the instructions provided in the C100/C120 *Programming, Installation, and Application Manual* published by Independent Energy Inc., No. 100141 Rev. C.

What is claimed is:

1. A light-transmitting thermal barrier comprising:
(a) a multi-layered light-transmitting insulation comprising a plurality of thermally-insulating plastic sheets on which are bubbles of plastic,
(b) each of said thermally-insulating plastic sheets being of substantially the same shape and area and in contact with an adjacent plastic sheet, said plurality of thermally-insulating plastic sheets having an outer plastic sheet on one side and an other outer plastic sheet on the other side,
(c) a first light-transmitting panel on one side of said light-transmitting insulation having an inner side,
(d) a second light-transmitting panel on the other side said light-transmitting insulation having an inner side,
(e) each of said first and second light-transmitting panels being substantially coextensive in area to the area of said multi-layered light-transmitting insulation,
(f) said first light-transmitting panel having a first plurality of inner ribs orthogonally extending from said inner side of and along said light-transmitting panel and in contact with said outer plastic sheet of said multi-layered light-transmitting insulation, said first plurality of inner ribs having outer edges,
(g) said second light-transmitting panel having a second plurality of inner ribs orthogonally extending from said inner side of and along said light-transmitting panel and in contact with said other outer plastic sheet of said multi-layered light-transmitting insulation, said second plurality of inner ribs having outer edges,
(h) a first plurality of spaced barbs extending orthogonally from the outer edges of at least some of said first plurality of inner ribs and piercing at least said contacted outer plastic sheet, and
(i) a second plurality of spaced barbs extending orthogonally from the outer edges of at least some of said second plurality of inner ribs and piercing at least said contacted other outer plastic sheet.

2. A light-transmitting thermal barrier according to claim 1 wherein said first and second plurality of spaced barbs each pierce a plurality of adjacent plastic sheets to hold said pierced plurality of adjacent plastic sheets in place.

3. A light-transmitting thermal barrier according to claim 1 wherein said spaced barbs extend from all of said first and second plurality of inner ribs.

4. A light-transmitting thermal barrier according to claim 3 wherein said first and second plurality of spaced barbs each pierce a plurality of adjacent plastic sheets to hold said pierced plurality of adjacent plastic sheets in place.

5. A light-transmitting thermal barrier according to claim 1 further including clear double-sided adhesive tape adhered to adjacent thermally-insulating plastic sheets.

6. A light-transmitting thermal barrier according to claim 2 further including clear double-sided adhesive tape adhered to adjacent thermally-insulating plastic sheets.

7. A light-transmitting thermal barrier comprising:
(a) a multi-layered light-transmitting insulation comprising a plurality of thermally-insulating plastic sheets on which are bubbles of plastic,
(b) each of said thermally-insulating plastic sheets being of substantially the same shape and area and in contact with an adjacent plastic sheet, said plurality of thermally-insulating plastic sheets having an outer plastic sheet on one side and an other outer plastic sheet on the other side,
(c) a first light-transmitting panel on one side of said light-transmitting insulation having an inner side,
(d) a second light-transmitting panel on the other side of said light-transmitting insulation having an inner side,
(e) each of said first and second light-transmitting panels being substantially coextensive in area to the area of said multi-layered light-transmitting insulation,
(f) said first light-transmitting panel having a first plurality of inner ribs orthogonally extending from said inner side of and along said light-transmitting panel and in contact with one of the outer plastic sheets of said multi-layered light-transmitting insulation, and
(g) said second light-transmitting panel having a second plurality of inner ribs orthogonally extending from the inner side of and along said light-transmitting panel and in contact with the other outer plastic sheet of said multi-layered light-transmitting insulation.

8. A light-transmitting thermal barrier according to claim 7 further including clear double-sided adhesive tape adhered to adjacent thermally-insulating plastic sheets.

9. A light-transmitting thermal barrier comprising:
(a) a multi-layered light-transmitting insulation comprising a plurality of thermally-insulating plastic sheets on which are bubbles of plastic,
(b) each of said thermally-insulating plastic sheets being of substantially the same shape and area and in contact with an adjacent plastic sheet, said plurality of thermally-insulating plastic sheets having an outer plastic sheet on one side and an other outer plastic sheet on the other side,
(c) a first light-transmitting panel on one side of said light-transmitting insulation having an inner side,
(d) a second light-transmitting panel on the other side of said light-transmitting insulation having an inner side,
(e) each of said first and second light-transmitting panels being substantially coextensive in area to the area of said multi-layered light-transmitting insulation,
(f) said first light-transmitting panel having a first plurality of inner ribs orthogonally extending from said inner side of and along said light-transmitting panel and in contact with said outer plastic sheet of said multi-layered light-transmitting insulation,
(g) said second light-transmitting panel having a second plurality of inner ribs orthogonally extending from said inner side of and along said light-transmitting panel and in contact with said other outer plastic sheet of said multi-layered light-transmitting insulation, and
(h) a rigid nonvacuum-sealed frame extending around the periphery of said light-transmitting panels and multi-layered light-transmitting insulation for supporting said panels and insulation in parallel spaced relation.

10. A light-transmitting thermal barrier according to claim 9 wherein each of said inner ribs of said first plurality of inner ribs has an outer edge which contacts said adjacent outer plastic sheet and each of said inner ribs of said second plurality of inner ribs has an outer edge which contacts said adjacent other outer plastic sheet and further comprising:
(i) a first plurality of spaced barbs extending orthogonally from said outer edge of at least some of said first plurality of inner ribs and piercing at least said contacted adjacent outer plastic sheet, and
(j) a second plurality of spaced barbs extending orthogonally from said outer edge of at least some of said second plurality of inner ribs and piercing at least said contacted other adjacent outer plastic sheet.

11. A light-transmitting thermal barrier according to claim 10 wherein said rigid frame is rectangular.

12. A light-transmitting thermal barrier comprising two rigid light-transmitting panels supported in parallel spaced relation by a rigid rectangular frame around the periphery of said panels and separated by a multi-layered light-transmitting insulation comprising a plurality of thermally-insulating adjacently contacting plastic sheets on which are bubbles of plastic, wherein each layer of light-transmitting insulation is substantially coextensive in area to the area of each light-transmitting panel and further including clear double-sided adhesive tape adhered to adjacent thermally-insulating plastic sheets.

13. A light-transmitting thermal barrier comprising two rigid light-transmitting panels supported in parallel spaced relation by a rigid rectangular frame around the periphery of said panels and separated by a multi-layered light-transmitting insulation comprising a plurality of contacting thermally-insulating plastic sheets on which are bubbles of plastic, wherein each layer of light-transmitting insulation is substantially coextensive in area to the area of each light-transmitting panel, each of said rigid light-transmitting panels having an inner side, said plurality of thermally-insulating plastic sheets having an outer plastic sheet on one side and an other outer plastic sheet on the other side, and wherein each of said light-transmitting panels has a plurality of inner ribs orthogonally extending from said inner side of and along said light-transmitting panel and in respective contact with said outer and said other outer plastic sheet of said multi-layered light-transmitting insulation.

14. A light-transmitting thermal barrier according to claim 13 wherein each of said plurality of inner ribs has an outer edge and at least some of said inner ribs of each of said two light-transmitting panels have a plurality of spaced barbs extending orthogonally from an outer edge thereof and respectively piercing at least said outer and said other outer plastic sheet.

15. A light-transmitting thermal barrier according to claim 14 further including clear double-sided adhesive tape adhered to adjacent contacting sides of at least some of said thermally-insulating plastic sheets.

16. A light-transmitting thermal barrier comprising:
(a) a translucent body of thermally-insulating material,
(b) a first light-transmitting panel on one side of said translucent body of thermally-insulating material having an inner side,
(c) a second light-transmitting panel on the other side of said translucent body of thermally-insulating material having an inner side,
(d) each of said first and second light-transmitting panels being substantially coextensive in area to the area of said translucent body of thermally-insulating material,
(e) said first light-transmitting panel having a first plurality of inner ribs orthogonally extending from said inner side of and along said light-transmitting panel and in contact with one side of said translucent body of thermally-insulating material, said inner ribs having outer edges,
(f) said second light-transmitting panel having a second plurality of inner ribs orthogonally extending from said inner side of and along said light-transmitting panel and in contact with the other side of said translucent body of thermally-insulating material, said inner ribs having outer edges,
(g) a first plurality of spaced barbs extending orthogonally from said outer edges of at least some of said first plurality of inner ribs and penetrating said one side of said translucent body of thermally-insulating material, and
(h) a second plurality of spaced barbs extending orthogonally from said outer edges of at least some of said second plurality of inner ribs and penetrating said other side of said translucent body of thermally-insulating material.

17. A translucent thermal barrier according to claim 16 wherein said spaced barbs extend from all of said first and second plurality of inner ribs.

18. A light-transmitting thermal barrier comprising:
(a) a translucent body of thermally-insulating material,
(b) a first light-transmitting panel on one side of said translucent body of thermally-insulating material having an inner side,
(c) a second light-transmitting panel on the other side of said translucent body of thermally-insulating material having an inner side,
(d) each of said first and second light-transmitting panels being substantially coextensive in area to the area of said translucent body of thermally-insulating material,
(e) said first light-transmitting panel having a first plurality of inner ribs orthogonally extending from said inner side of and along said light-transmitting panel and in contact with one side of said translucent body of thermally-insulating material,
(f) said second light-transmitting panel having a second plurality of inner ribs orthogonally extending from said inner side of and along said light-transmitting panel and in contact with the other side of said translucent body of thermally-insulating material.

19. A light-transmitting thermal barrier comprising:
(a) a translucent body of thermally-insulating material,
(b) a first light-transmitting panel on one side of said translucent body of thermally-insulating material having an inner side,
(c) a second light-transmitting panel on the other side of said translucent body of thermally-insulating material having an inner side,
(d) each of said first and second light-transmitting panels being substantially coextensive in area to the area of said translucent body of thermally-insulating material,
(e) said first light-transmitting panel having a first plurality of inner ribs orthogonally extending from said inner side of and along said light-transmitting panel and in contact with one side of said translucent body of thermally-insulating material,
(f) said second light-transmitting panel having a second plurality of inner ribs orthogonally extending from said inner side of and along said light-transmitting panel and in contact with the other side of said translucent body of thermally-insulating material, and
(g) a rigid nonvacuum-sealed frame extending around the periphery of said light-transmitting panels and said translucent body of thermally-insulating material for supporting said panels and body of thermally-insulating material in parallel spaced relation.

20. A translucent thermal barrier according to claim 19 wherein each of said plurality of inner ribs has an outer edge and further comprising:
(i) a first plurality of spaced barbs extending orthogonally from said outer edges of at least some of said first plurality of inner ribs and penetrating said translucent body of thermally-insulating material, and
(j) a second plurality of spaced barbs extending orthogonally from said outer edges of at least some of said second plurality of inner ribs and penetrating said translucent body of thermally-insulating material.

21. A translucent thermal barrier according to claim 19 wherein said rigid frame is rectangular.

* * * * *